US011796460B2

United States Patent
Furuya et al.

(10) Patent No.: US 11,796,460 B2
(45) Date of Patent: Oct. 24, 2023

(54) ABSORBANCE ANALYSIS APPARATUS FOR DCR GAS, ABSORBANCE ANALYSIS METHOD FOR DCR GAS, AND ABSORBANCE ANALYSIS PROGRAM RECORDING MEDIUM ON WHICH PROGRAM FOR DCR GAS IS RECORDED

(71) Applicants: Tokyo Electron Limited, Tokyo (JP); HORIBA STEC, Co., Ltd., Kyoto (JP)

(72) Inventors: Yuichi Furuya, Yamanashi (JP); Masayuki Tanaka, Yamanashi (JP); Yuhei Sakaguchi, Kyoto (JP); Masakazu Minami, Kyoto (JP); Toru Shimizu, Kyoto (JP)

(73) Assignees: TOKYO ELECTRON LIMITED, Tokyo (JP); HORIBA STEC, CO., LTD., Kyoto (JP)

( * ) Notice: Subject to any disclaimer, the term of this patent is extended or adjusted under 35 U.S.C. 154(b) by 72 days.

(21) Appl. No.: 17/695,167

(22) Filed: Mar. 15, 2022

(65) Prior Publication Data

US 2022/0307977 A1    Sep. 29, 2022

(30) Foreign Application Priority Data

Mar. 24, 2021  (JP) ................................. 2021-049513

(51) Int. Cl.
*G01N 21/3518*  (2014.01)
(52) U.S. Cl.
CPC .............................. *G01N 21/3518* (2013.01)

(58) Field of Classification Search
CPC .................................................. G01N 21/3518
See application file for complete search history.

(56) References Cited

U.S. PATENT DOCUMENTS

| 6,878,940 | B2 | 4/2005 | Nakamura et al. |
| 2003/0071218 | A1 | 4/2003 | Nakamura et al. |
| 2007/0238288 | A1* | 10/2007 | Suzuki .............. H01L 21/76844 |
| | | | 257/E21.17 |
| 2022/0307977 | A1* | 9/2022 | Furuya ............... G01N 21/3518 |

FOREIGN PATENT DOCUMENTS

JP    2003-172700    6/2003

* cited by examiner

*Primary Examiner* — David P Porta
*Assistant Examiner* — Casey Bryant
(74) *Attorney, Agent, or Firm* — Greenblum & Bernstein, P.L.C.

(57) ABSTRACT

In order to provide an absorbance analysis apparatus for DCR gas that can measure a concentration of a DCR gas by separating absorbance of the DCR gas alone even in a mixed gas consisting of the DCR gas and CO gas whose absorption spectrum overlaps each other, the absorbance analysis apparatus for DCR gas comprises a DCR filter 31 that is configured to transmit a light in a first wavenumber domain including an absorbance peak of the DCR gas, a CO filter 32 that is configured to transmit a light in a second wavenumber domain that is different from the first wavenumber domain, and a DCR gas volume calculator 4 that is configured to calculate volume of the DCR gas based on a first absorbance measured by the light transmitted through the DCR filter 31 and a second absorbance measured by the light transmitted through the CO filter 32.

5 Claims, 3 Drawing Sheets

ABSORBANCE ANALYSIS APPARATUS FOR DCR GAS, ABSORBANCE ANALYSIS METHOD FOR DCR GAS, AND ABSORBANCE ANALYSIS PROGRAM RECORDING MEDIUM ON WHICH PROGRAM FOR DCR GAS IS RECORDED

CROSS-REFERENCE TO RELATED APPLICATION

This application is based upon and claims the benefit of priority from Japanese Patent Application No. 2021-049513, filed on Mar. 24, 2021, the entire contents of which are incorporated herein by reference.

FIELD OF THE ART

This invention relates to an absorbance analysis apparatus for DCR gas that measures volume of a DCR gas in a mixed gas consisting of a CO gas which is a carrier gas and the DCR gas which is a component gas.

BACKGROUND ART

It has been studied that a DCR (Dodecacarbonyl Triruthenium: $Ru_3(CO)_{12}$) gas is used in order to form a ruthenium thin film or a ruthenium compound thin film by a chemical vapor deposition method such as a CVD method or an ALD method. The DCR gas is supplied in a predetermined concentration or at a predetermined flow rate in a vacuum chamber using, for example, a CO gas as a carrier gas.

It can be conceived that the NDIR (Non Dispersive infrared) method is used for measuring the concentration of the DCR gas in the mixed gas consisting of the DCR gas and the CO gas.

By the way, since almost all of the absorption spectrum of the DCR overlaps with a part of the absorption spectrum of the CO, the influence of absorbance of both the DCR and the CO will occur if the analysis is performed at an absorbance wavelength of the DCR. Therefore, it is not possible to isolate the absorbance of the DCR alone so that the concentration and flow rate of the DCR gas cannot be calculated accurately.

In case that the NDIR method is used to measure the components of, for example, an exhaust gas, the concentration of the CO or the $CO_2$ which is a target gas in the exhaust gas is measured and the concentration of moisture which is an interference component whose absorbance wavelength domain overlaps with that of the target gas is also measured by using optical filters, described in a patent document 1, that transmit infrared rays in the absorbance wavelength domain of each gas in almost all areas. The concentration of the moisture is then subtracted from the measured concentration of the target gas as zero-point interference correction.

However, even if the above-mentioned method is simply applied to the mixed gas consisting of the DCR gas and the CO gas, it is difficult to accurately measure the concentration of the DCR gas.

PRIOR ART DOCUMENT

Patent Document

[Patent document 1] Japanese Unexamined Patent Application Publication No. 2003-172700

OUTLINE OF THE INVENTION

Problem to be Solved by the Invention

The present claimed invention has been made to solve the above-mentioned problems, and an object of this invention is to provide an absorbance analysis apparatus for DCR gas that can calculate a concentration of a DCR gas by separating the absorbance of the DCR gas alone from the mixed gas consisting of the DCR gas and the CO gas whose absorption spectra overlaps each other.

Means to Solve the Problem

More specifically, the present claimed invention is an absorbance analysis apparatus for DCR gas that measures volume of a DCR gas in a mixed gas consisting of a CO gas which is a carrier gas and the DCR ($Ru_3(CO)_{12}$) gas which is a component gas, and comprises a DCR filter that is configured to transmit a light in a first wavenumber domain including an absorbance peak of the DCR gas, a CO filter that is configured to transmit a light in a second wavenumber domain that is the absorbance wavenumber domain of the CO gas and that is different from the first wavenumber domain, and a DCR gas volume calculator that is configured to calculate volume of the DCR gas based on a first absorbance measured by the light transmitted through the DCR filter and a second absorbance measured by the light transmitted through the CO filter, and is characterized by that the DCR gas volume calculator comprises an interference affected estimation section that is configured to estimate an interference affected absorbance, which is the absorbance of the CO gas in the first wavenumber domain based on the second absorbance, an absorbance correction section that is configured to correct the first absorbance to the absorbance of the DCR gas by subtracting the interference affected absorbance from the first absorbance, and a conversion section that is configured to convert the absorbance of the DCR gas into the volume of the DCR gas contained in the mixed gas based on the absorbance of the DCR gas corrected by the absorbance correction section.

In addition, the present claimed invention is an absorbance analysis method for DCR gas that measures volume of a DCR gas in a mixed gas consisting of a CO gas which is a carrier gas and the DCR ($Ru_3(CO)_{12}$) gas which is a component gas, and includes to provide a DCR filter that transmits a light in a first wavenumber domain including an absorbance peak of the DCR gas, to provide a CO filter that transmits a light in a second wavenumber domain that is the absorbance wavenumber domain of the CO gas and that is different from the first wavenumber domain, and to calculate volume of the DCR gas based on a first absorbance measured by the light transmitted through the DCR filter and a second absorbance measured by the light transmitted through the CO filter, and is characterized by that to calculate the volume of the DCR gas includes to estimate the interference affected absorbance, which is the absorbance of the CO gas in the first wavenumber domain based on the second absorbance, to correct the first absorbance to the absorbance of the DCR gas by subtracting the interference affected absorbance from the first absorbance, and to convert the absorbance of the DCR gas into the volume of the DCR gas contained in the mixed gas based on the absorbance of the DCR gas corrected by the absorbance correction section.

In accordance with this arrangement, it is possible to obtain the first absorbance that is affected by an influence of each absorption of the DCR gas and the CO gas due to the DCR filter and the second absorbance that is not nearly affected by the absorption of the DCR gas and on which the concentration of the CO gas is accurately reflected.

More specifically, it is possible to accurately estimate the interference affected absorbance, which is the absorbance of the CO gas in the first wavenumber domain based on the second absorbance. Furthermore, since the first absorbance is corrected to the absorbance of the DCR gas by subtracting the interference affected absorbance from the first absorbance, it is possible to obtain the accurate absorbance of the DCR gas.

In order to make it possible to obtain the volume of the DCR gas more accurately by making both the influence of the absorbance due to the absorbance peak of the DCR gas on the first absorbance appear the most and the influence of the absorbance due to the absorbance peak of the CO gas on the second absorbance appear the most, the first wavenumber domain may include 2067/cm and the second wavenumber domain may include 2165/cm.

In order to make it unnecessary to conduct a complicated arithmetic operation and to make it possible to calculate the concentration of the DCR gas successively in a control cycle necessary for controlling the concentration, the absorbance correction section may calculate the interference affected absorbance by multiplying the second absorbance by a predetermined coefficient.

In order to make it possible to enjoy almost the same effect as that of the absorbance analysis apparatus for DCR gas in accordance with this invention by updating programs for an existing absorbance analysis apparatus, programs may be used that is for an absorbance analysis apparatus for DCR gas that measures volume of the DCR gas in a mixed gas consisting of a CO gas which is a carrier gas and a DCR ($Ru_3(CO)_{12}$) gas which is a component gas and that comprises a DCR filter that is configured to transmit a light in a first wavenumber domain including an absorbance peak of the DCR gas, and a CO filter that is configured to transmit a light in a second wavenumber domain that is the absorbance wavenumber domain of the CO gas and that is different from the first wavenumber domain, and the program of absorbance analysis for DCR gas produces a function as a DCR gas volume calculator that is configured to calculate volume of the DCR gas based on a first absorbance measured by the light transmitted through the DCR filter and a second absorbance measured by the light transmitted through the CO filter, and the DCR gas volume calculator comprises an interference affected estimation section that is configure to estimate the interference affected absorbance, which is the absorbance of the CO gas in the first wavenumber domain based on the second absorbance, an absorbance correction section that is configured to correct the first absorbance to the absorbance of the DCR gas by subtracting the interference affected absorbance from the first absorbance, and a conversion section that is configured to convert the absorbance of the DCR gas into the volume of the DCR gas contained in the mixed gas based on the absorbance of the DCR gas corrected by the absorbance correction section.

The absorbance analysis program for DCR gas may be electronically distributed or may be stored on a program recording medium such as a CD, a DVD or a flash memory.

Effect of the Invention

As mentioned, in accordance with the absorbance analysis apparatus for DCR gas of the present claimed invention, it is possible to obtain the absorbance due to the absorption of the DCR gas alone by accurately estimating the interference affected absorbance caused by the absorption of the CO gas included in the first absorbance based on the second absorbance that reflects the concentration of the CO gas and by correcting the first absorbance based on the interference affected absorbance. As a result of this, it is possible to accurately calculate the volume such as its concentration and partial pressure of the DCR gas.

BEST MODES FOR EMBODYING THE INVENTION

An absorbance analysis apparatus for DCR gas 100 in accordance with one embodiment of the present claimed invention will be explained with reference to drawings.

This absorbance analysis apparatus for DCR gas 100 is configured to measure a concentration of a DCR gas supplied into a chamber by an NDIR method in a semiconductor manufacturing process using a chemical vapor deposition method such as a CVD method or an ALD method. A mixed gas consisting of a CO gas which is a carrier gas and the DCR gas which is a component gas is supplied into the chamber. This is to prevent separation of the CO group of the DCR gas and decomposition of the DCR gas before it is supplied to the chamber.

Figure 1:
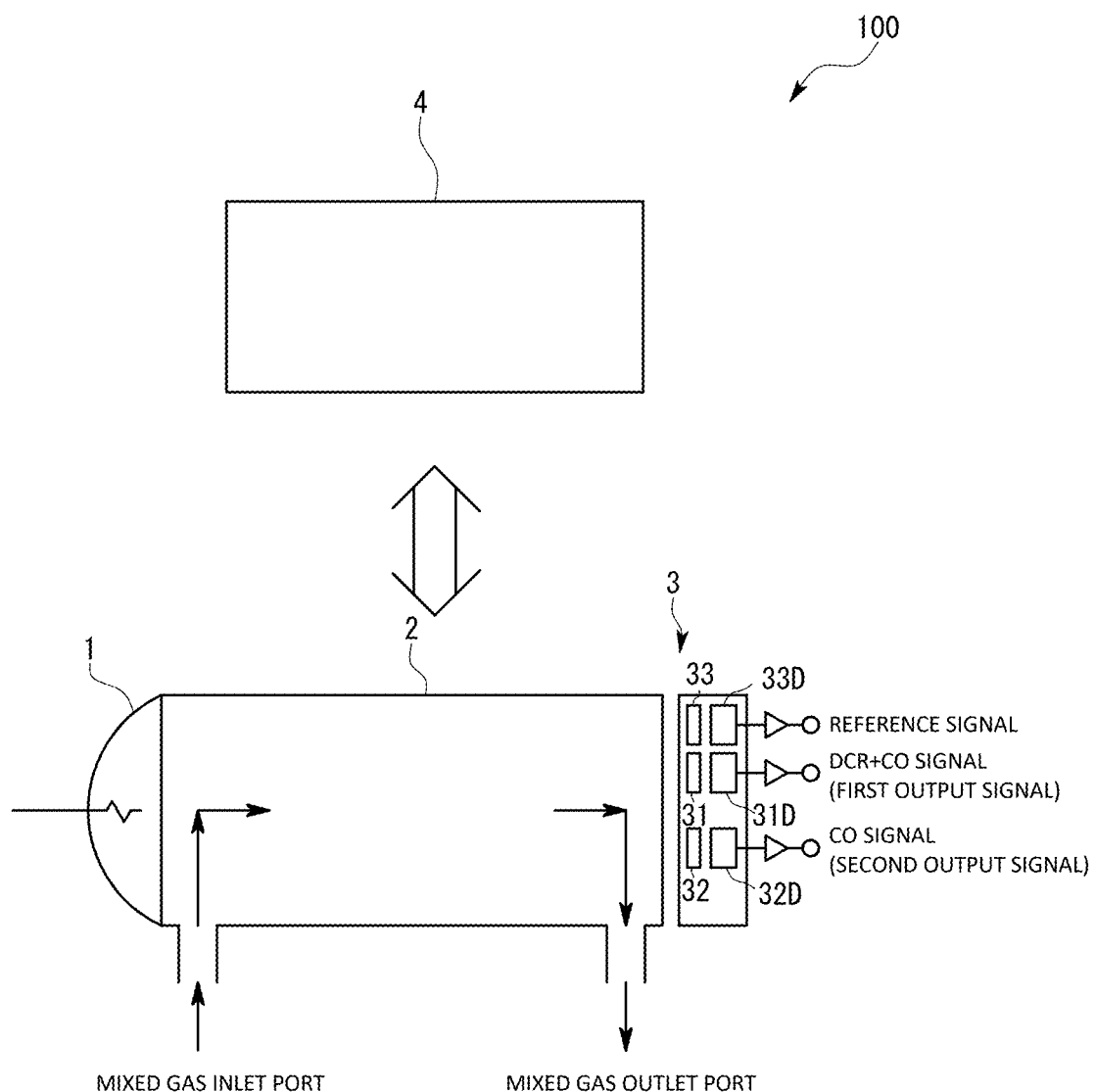
FIG. 1 A schematic diagram showing an absorbance analysis apparatus for DCR gas in accordance with one embodiment of the present claimed invention.

As shown in FIG. 1, the absorbance analysis apparatus for DCR gas 100 comprises a translucent and roughly cylindrical cell 2 that is mounted on a flow channel through which the mixed gas flows, a light source 1 that injects an infrared light having a predetermined spectrum into the cell 2 from one end surface of the cell 2, and a light detection mechanism 3 that detects the infrared light emitted from the other end surface side of the cell 2 and a DCR gas volume calculator 4 that calculates the concentration of the DCR gas based on an output of the light detection mechanism 3.

Each part will be described in detail.

The light source 1 is configured to emit the infrared light in a wavenumber domain that includes at least the wavenumbers of the absorbance peak of the DCR gas and the absorbance peak of the CO gas.

The cell 2 is a so-called flow cell comprising a mixed gas inlet port that opens at a side surface part of the light source 1 side and a mixed gas outlet port that opens at a side surface part of the light detection mechanism 3 side so that the mixed gas circulates in the cell 2.

The light detection mechanism 3 comprises three sets of filters and detectors, which are arranged to face the other end surface side of the cell 2. In this embodiment, the three sets of the filters and the detectors are a DCR filter 31 and a DCR detector 31D for measuring first absorbance $A_1$ due to absorption of the DCR gas and the CO gas, a CO filter 32 and a CO detector 32D for measuring second absorbance $A_{C2}$ due to absorption of the CO gas alone and a reference filter 33 and a reference detector 33D for outputting a comparison signal. Each of the filters is a bandpass filter, and the wavenumber domain of the light to be transmitted is different respectively. Each of the detectors uses the same type of, for example, a pyroelectric infrared sensor.

Each of the filters will be explained in detail.

The DCR filter 31 is configured to transmit the light of the first wavenumber domain including the absorption spectrum perk of the DCR gas. Since the peak of the absorption spectrum of the DCR gas is at 2067/cm, the first wavenumber domain is configured to include the absorbance peak and the wavenumber in the vicinity of the absorbance peak.

On the other hand, the CO filter 32 is configured to transmit the light in the second wavenumber domain, which is the absorbance wavenumber domain of the CO gas and is different from the first wavenumber domain. In this embodiment, the absorption spectrum of the DCR gas is not practically existent in the second wavenumber domain, or the absorbance of the DCR gas is almost negligible compared to the absorbance of the CO gas. More concretely, the second wavenumber domain is set to include the wavenumber of 2165/cm and its vicinity, where the absorbance of the DCR gas is almost negligible.

The reference filter 33 is configured to transmit the infrared light in the wavenumber domain where the absorption of the DCR gas and the CO gas is not almost existent. More specifically, the comparison signal reflects the intensity of the infrared light in case that practically no absorption of the DCR gas and the CO gas is existent.

Figure 2:
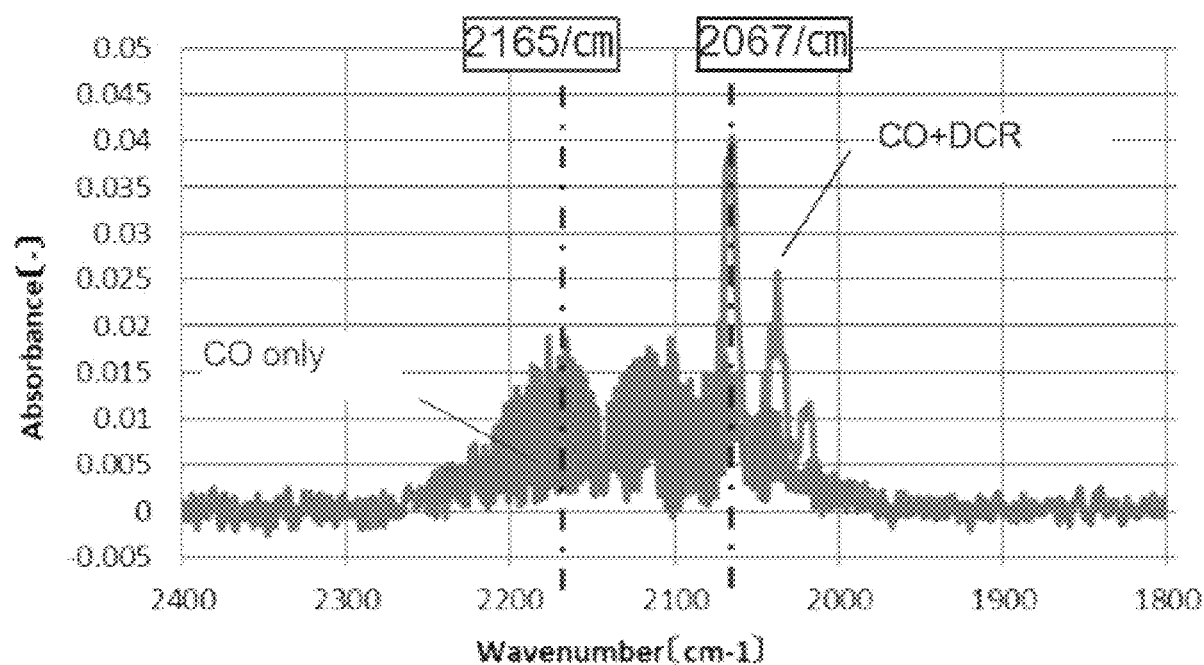
FIG. 2 A graph showing an absorption spectrum of a DCR gas and a CO gas and transmission settings of each filter in this embodiment.

FIG. 2 shows measurement results of the absorption spectra in case that the mixed gas flows and in case that the CO gas alone flows. In both measurement results, the flow rate of the CO gas is set at the same value. As can be seen from the measurement results in FIG. 2, there is almost no change in the absorbance in the vicinity of 2165/cm between a case that the mixed gas flows and a case that the CO gas alone flows. In other words, by measuring the absorbance in the second wavenumber domain using the CO filter 32, it is revealed that it is possible to obtain the absorbance on which influence of the CO gas alone in the mixed gas appears based on an output from the CO detector 32D also in case that the mixed gas flows. On the other hand, since the absorption is caused also by the CO gas alone in the vicinity of 2067/cm, it is revealed that the absorbance measured in the first wavenumber domain is influenced by not only the absorbance of the DCR gas but also the absorbance of the CO gas in case that the mixed gas flows.

Figure 3:
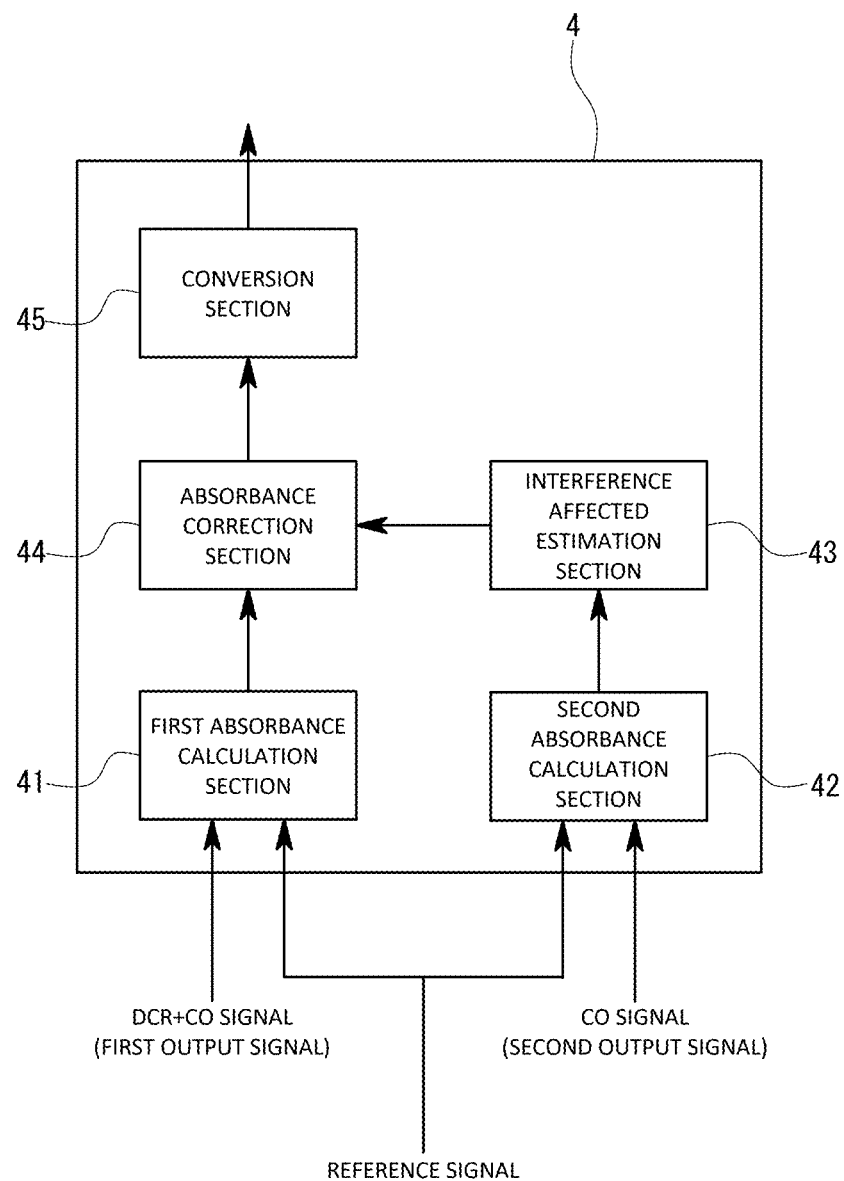
FIG. 3 A functional block diagram showing a configuration of a DCR gas volume calculator in this embodiment.

Next, a configuration of the DCR gas volume calculator 4 will be explained with reference to the functional block diagram in FIG. 3.

The DCR gas volume calculator 4 is configured to calculate the concentration of the DCR gas in the mixed gas based on the first absorbance $A_1$, which is the measurement result in the first wavenumber domain obtained by the light detection mechanism 3, and the second absorbance $A_{C2}$, which is the measurement result in the second wavenumber domain. The DCR gas volume calculator 4 is so-called a computer comprising a CPU, a memory, an A/D converter, a D/A converter and various input/output means and produces its functions by executing absorbance analysis programs for the DCR gas stored in the memory. Concretely, the DCR gas volume calculator 4 produces functions as at least a first absorbance calculation section 41, a second absorbance calculation section 42, an interference affected estimation section 43, an absorbance correction section 44, and a conversion section 45 by being cooperatively working with each section.

A DCR+CO signal (a first output signal) output by the DCR detector 31D and a comparison signal output by the reference detector 33D are input into the first absorbance calculation section 41, and the first absorbance calculation section 41 calculates the first absorbance $A_1$, which is a sum of the absorbance $A_{D1}$ of the DCR gas and the absorbance $A_{C1}$ of the CO gas in the first wavenumber domain based on values indicated by the first output signal and the comparison signal. More specifically, it can be expressed as $A_1=A_{D1}+A_{C1}$. An existing method for calculating the absorbance can be used.

The CO signal (a second output signal) output by the CO detector 32D and the comparison signal output by the reference detector 33D are input into the second absorbance calculation section 42, and the second absorbance calculation section 42 calculates the second absorbance $A_{C2}$, which the absorbance $A_{C2}$ of the CO gas in the second wavenumber domain based on values indicated by the CO signal and the comparison signal.

The interference affected estimation section 43 is configured to estimate the interference affected absorbance $A_{C1}$, which is the absorbance of the CO gas in the first wavenumber domain based on the second absorbance $A_{C2}$. The interference affected estimation section 43 calculates the interference affected absorbance $A_{C1}$ by multiplying the second absorbance $A_{C2}$ by an appropriate coefficient K. The interference affected absorbance $A_{C1}$ may be obtained by using a relationship equation with $A_{C2}$ as an input variable and $A_{C1}$ as an output variable.

The absorbance correction section 44 corrects the absorbance of the first absorbance $A_1$ to the absorbance $A_{D1}$ of the DCR gas by subtracting the interference affected absorbance $A_{C1}$ from the first absorbance $A_1$. In other words, it can be expressed as $A_{D1}=A_1-A_{C1}=A_1-K*A_{C2}$.

The conversion section 45 converts the absorbance of the DCR gas into the concentration of the DCR gas contained in the mixed gas and based on the absorbance $A_{D1}$ of the DCR gas corrected by the absorbance correction section 44 and the Lambert-Veil law. This converted concentration of the DCR gas is output to the outside to be displayed or used for concentration control.

In accordance with the absorbance analysis apparatus for DCR 100 of this embodiment, since it is possible to obtain the second absorbance $A_{C2}$ while the absorption of the CO gas alone is occurring even in case that the mixed gas flows by the use of the CO filter 32, it is possible to estimate the interference affected absorbance $A_{C1}$, which is the influence of the absorption of the CO gas included in the first absorbance $A_1$, based on the value of the second absorbance $A_{C2}$.

In addition, since it is possible to calculate the absorbance $A_{D1}$ due to the absorption of the DCR gas alone by subtracting the interference affected absorbance $A_{C1}$ from the first absorbance $A_1$, the concentration of the DCR gas in the mixed gas can be calculated accurately by the conversion section 45.

Other embodiments will be explained.

The DCR filter and the CO filter are not limited to those shown in the above embodiment, and the wavenumber domain to be transmitted may be set appropriately.

The light detection mechanism is not limited to the one shown in the above-mentioned embodiment but may use the configuration of an existing NDIR analyzer. For example, instead of preparing multiple detectors, only one detector may be prepared, and the filter placed between the cell and the detector can be switched at high speed.

The output of the conversion section may not be the concentration of the DCR gas but may be a partial pressure or a flow rate of the DCR gas. The partial pressure may be converted from the concentration definition equation.

In addition, various variations of the embodiments and combinations of parts of each embodiment are acceptable as far as it is not conflict with a spirit of the present claimed invention.

The invention claimed is:

1. An absorbance analysis apparatus for DCR gas to measure volume of a DCR gas in a mixed gas consisting of a CO gas which is a carrier gas and the DCR ($Ru_3(CO)_{12}$) gas which is a component gas, wherein comprising a DCR filter that is configured to transmit a light in a first wavenumber domain including an absorbance peak of the DCR gas, a CO filter that is configured to transmit a light in a second wavenumber domain that is the absorbance wavenumber domain of the CO gas and that is different from the first wavenumber domain, and a DCR gas volume calculator that is configured to calculate the volume of the DCR gas based on a first absorbance measured by the light transmitted through the DCR filter and a second absorbance measured by the light transmitted through the CO filter, wherein the DCR gas volume calculator comprises an interference affected estimation section that is configured to estimate an interference affected absorbance, which is the absorbance of the CO gas in the first wavenumber domain, based on the second absorbance, an absorbance correction section that is configured to correct the first absorbance to the absorbance of the DCR gas by subtracting the interference affected absorbance from the first absorbance, and a conversion section that is configured to convert the absorbance of the DCR gas into the volume of the DCR gas contained in the mixed gas based on the absorbance of the DCR gas corrected by the absorbance correction section.

2. The absorbance analysis apparatus for DCR gas described in claim 1, wherein the first wavenumber domain includes 2067/cm and the second wavenumber domain includes 2165/cm.

3. The absorbance analysis apparatus for DCR gas described in claim 1, wherein the absorbance correction section is configured to calculate the interference affected absorbance by multiplying the second absorbance by a predetermined coefficient.

4. An absorbance analysis method for DCR gas that measures volume of a DCR gas in a mixed gas consisting of a CO gas which is a carrier gas and DCR ($Ru_3(CO)_{12}$) gas which is a component gas, wherein comprising to provide a DCR filter that transmits a light in a first wavenumber domain including an absorbance peak of the DCR gas, to provide a CO filter that transmits a light in a second wavenumber domain that is the absorbance wavenumber domain of the CO gas and that is different from the first wavenumber domain, and to calculate the volume of the DCR gas based on a first absorbance measured by the light transmitted through the DCR filter and a second absorbance measured by the light transmitted through the CO filter, wherein to calculate the volume of the DCR gas includes to estimate an interference affected absorbance, which is the absorbance of the CO gas in the first wavenumber domain based on the second absorbance, to correct the first absorbance to the absorbance of the DCR gas by subtracting the interference affected absorbance from the first absorbance, and to convert the absorbance of the DCR gas into the volume of the DCR gas contained in the mixed gas based on the absorbance of the DCR gas corrected by the absorbance correction section.

5. A non-transitory computer readable program recording media that records a program for an absorbance analysis for DCR gas used for an absorbance analysis apparatus for DCR gas that measures volume of a DCR gas in a mixed gas consisting of a CO gas which is a carrier gas and a DCR ($Ru_3(CO)_{12}$) gas which is a component gas and that comprises a DCR filter that transmits a light in a first wavenumber domain including an absorbance peak of the DCR gas, and a CO filter that transmits a light in a second wavenumber domain that is the absorbance wavenumber domain of the CO gas and that is different from the first wavenumber domain, wherein the program for the absorbance analysis for DCR gas produces a function as a DCR gas volume calculator that calculates the volume of the DCR gas based on a first absorbance measured by the light transmitted through the DCR filter and a second absorbance measured by the light transmitted through the CO filter, and the DCR gas volume calculator comprises an interference affected estimation section that estimates an interference affected absorbance, which is the absorbance of the CO gas in the first wavenumber domain based on the second absorbance, an absorbance correction section that corrects the first absorbance to the absorbance of the DCR gas by subtracting the interference affected absorbance from the first absorbance, and a conversion section that converts the absorbance of the DCR gas into the volume of the DCR gas contained in the mixed gas based on the absorbance of the DCR gas corrected by the absorbance correction section.

* * * * *